June 16, 1931. J. H. COYNE Re. 18,097

SEMISLEEVE VALVE MOTOR

Original Filed March 31, 1924 4 Sheets-Sheet 1

Inventor
John Heber Coyne
By
Atty.

June 16, 1931. J. H. COYNE Re. 18,097

SEMISLEEVE VALVE MOTOR

Original Filed March 31, 1924 4 Sheets-Sheet 2

Inventor:-
John Heber Coyne
By [signature]
Atty

June 16, 1931. J. H. COYNE Re. 18,097

SEMISLEEVE VALVE MOTOR

Original Filed March 31, 1924 4 Sheets-Sheet 3

Inventor
John Heber Coyne
By [signature] Atty.

June 16, 1931. J. H. COYNE Re. 18,097

SEMISLEEVE VALVE MOTOR

Original Filed March 31, 1924 4 Sheets-Sheet 4

Inventor
John Heber Coyne
By Atty.

Reissued June 16, 1931

Re. 18,097

UNITED STATES PATENT OFFICE

JOHN HEBER COYNE, OF BUFFALO, NEW YORK, ASSIGNOR, BY MESNE ASSIGNMENTS, TO BI-SLEEVE ENGINE COMPANY, OF CHICAGO, ILLINOIS, A CORPORATION OF ILLINOIS

SEMISLEEVE VALVE MOTOR

Original No. 1,549,297, dated August 11, 1925, Serial No. 703,107, filed March 31, 1924. Application for reissue filed February 16, 1931. Serial No. 516,231.

This invention relates to the so-called semi-sleeve motors and has for its object an improved means for sealing the valves adjacent the ports.

Another feature of the construction is the separable pilot casting used between the crank case casting and the engine block for centering the inner cylinder with respect to the outer block. This makes it easier to make the castings that go to make up the power unit and also gives access to the top of the crank case for fitting some of the operating parts in place before the assembly is completed. This will be more fully explained hereinafter.

The so-called semi-sleeve motor is not broadly new. Such a motor has been previously built and put into operation but it has been found relatively difficult to properly retain the gases, for these escape between the port and the sliding valve.

A motor of this type is provided with a cylinder block *a*, provided with the usual water jacket space *b*, the inset cylinder head *c*, exhaust manifold *d*, etc. A pair of cylinder segments or semi-sleeves *f* and *g* are reciprocated vertically by the connecting rods *f'* and *g'*. These sliding cylinder segments control the intake port *h* and the exhaust port *i*. The connecting rods are suitably timed to open and close the ports at the proper times.

Figure 1:
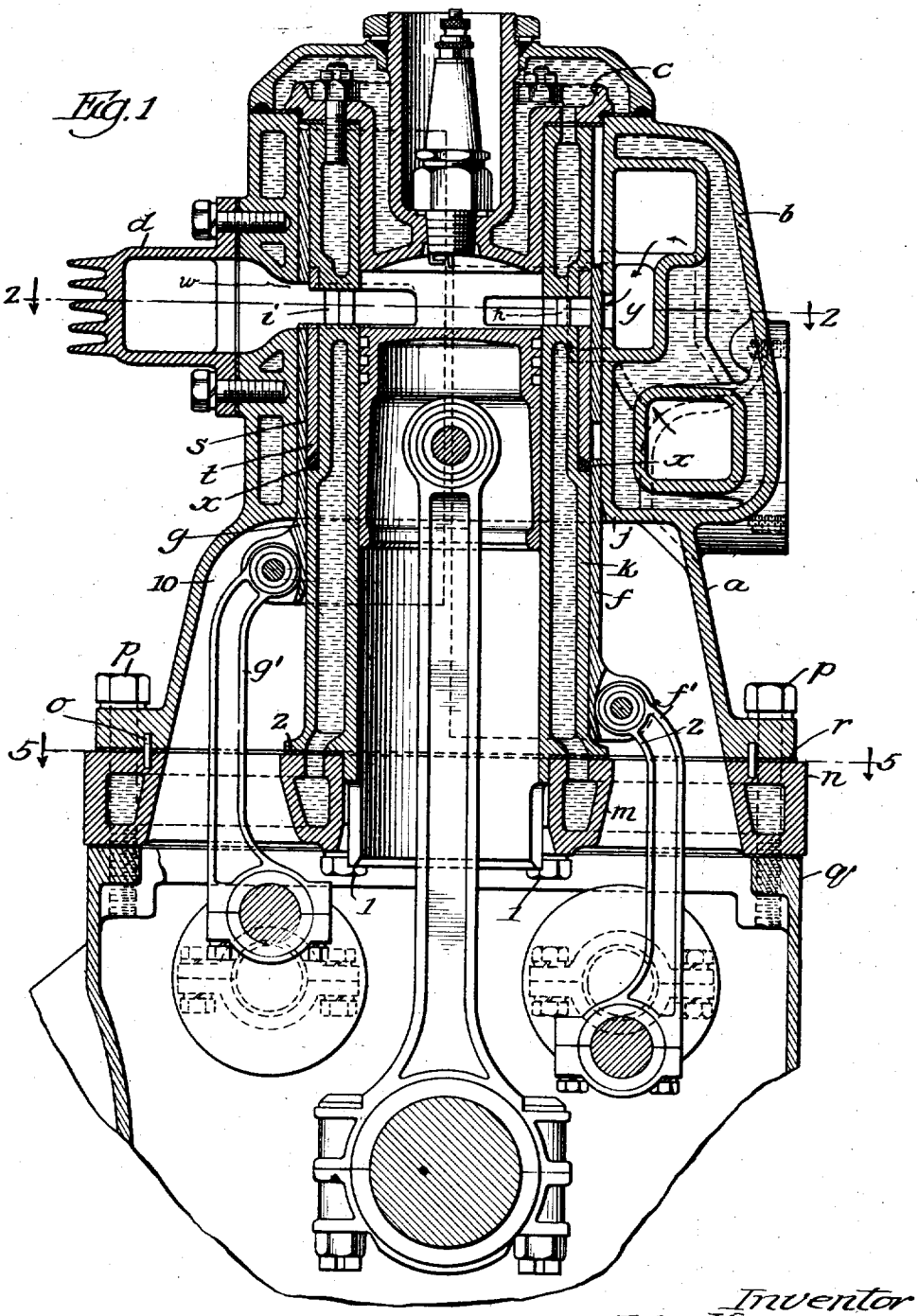
Fig. 1 is a vertical cross section of the improved engine.
Figure 2:
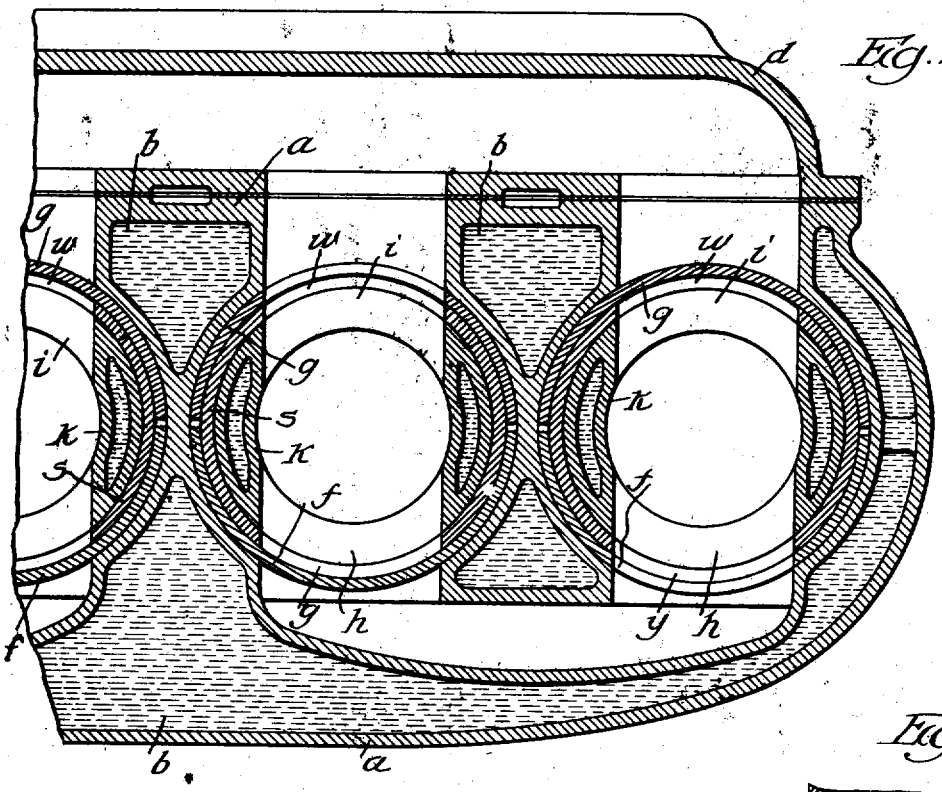
Fig. 2 is a section taken on the line 2—2 of Fig. 1.
Figure 6:
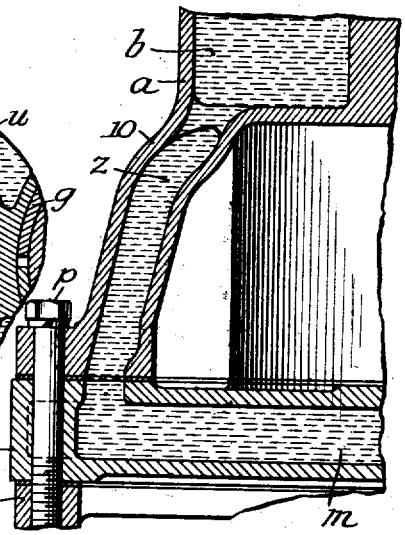
Fig. 6 is a vertical cross section through a portion of the engine taken on the line 6—6 of Fig. 5.
Figure 3:
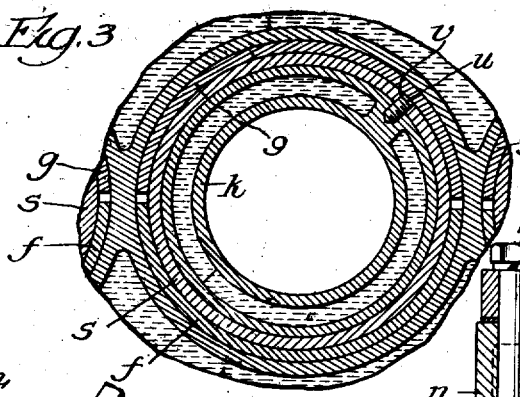
Fig. 3 is a cross section of one of the cylinders showing the junk ring and the retaining means therefor.
Figure 5:
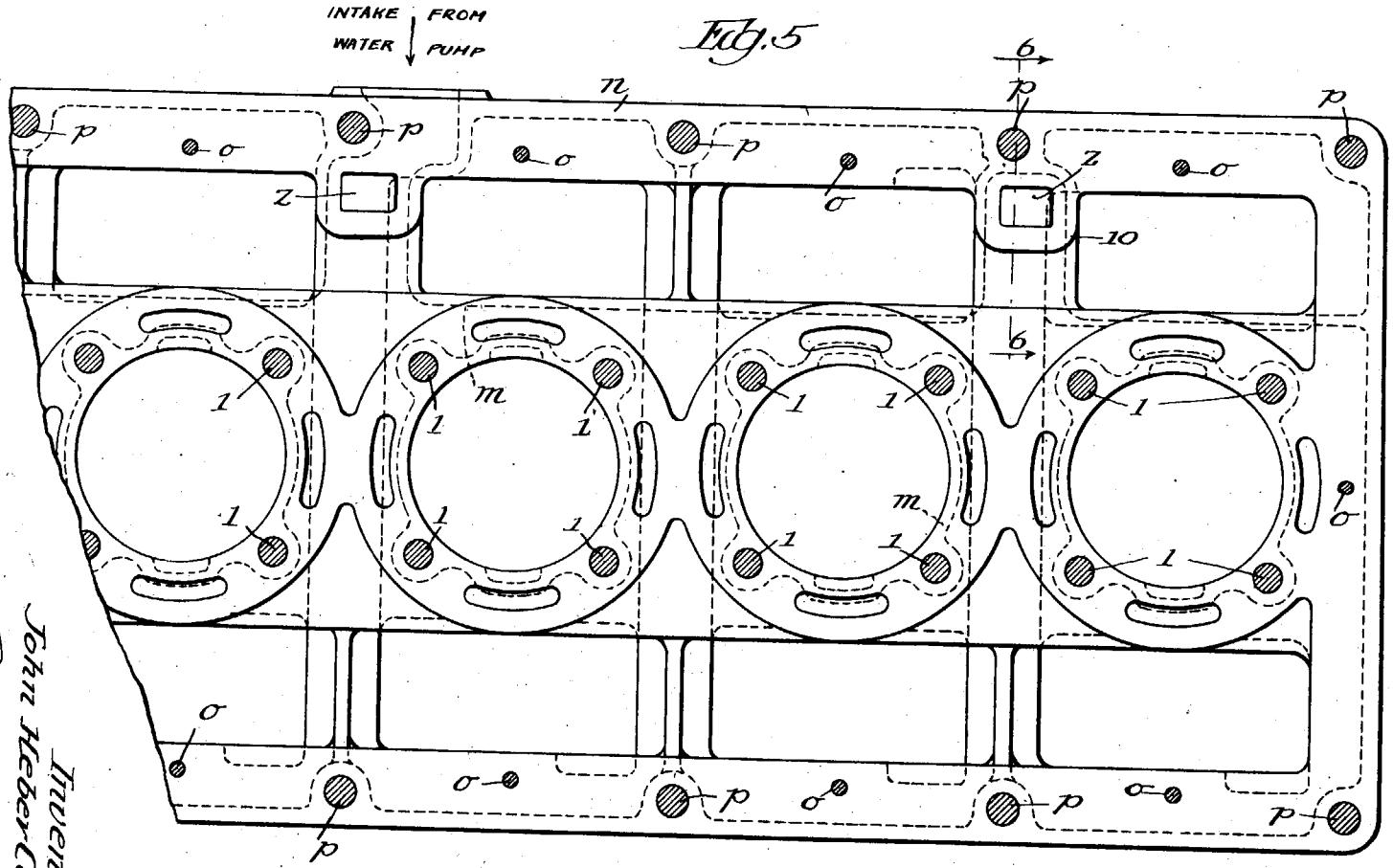
Fig. 5 is a fragmentary plan view of the pilot casting taken on the line 5—5 of Fig. 1.

These semi-sleeve valves reciprocate between an outer cylinder *j* and a water cooled inner cylinder *k*. Now it is necessary to accurately seat the inner cylinder with respect to the outer cylinder so that an absolutely accurate space is obtained in order that the sleeves may not bind, nor be too loose. Therefore, in order to center the inner cylinder a water-cooled pilot web *m* is provided. This web, I form as a separate casting *n* (see Fig. 5). This casting *n* is doweled by the dowels *o* onto the upper engine block casting so as to be absolutely accurately fitted with respect to the engine casting so as to properly center the inner cylinders. Cap screws *p* run through the casting *n* into the crank case casting *q*. Suitable packing *r* is fitted onto either side of the casting *n*. In order to make definite reference to this casting *n*, I shall call it the pilot casting. It is fitted in between the upper and lower main castings of the engine in much the same way a gasket would be, but carries the water-cooled bridge *m*, which is provided with a pilot opening for each cylinder *k*. These cylinders *k* are properly centered with respect to the engine block at the top by means of each cylinder head *c*. The water is circulated into the pilot castings through the passageways *z* (see Figs. 5 and 6) cored out of the thickened portions 10 in the engine block casting.

Figure 4:
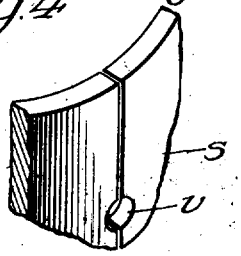
Fig. 4 is a fragmentary perspective of the junk ring.

In order to successfully seal the valves at the ports, I provide large junk rings *s*. The junk ring fits into a large recess or socket *t* in the inner cylinder and the junk ring forms quite a large part of the sliding surface on which the two semi-sleeves slide. There is one junk ring for each cylinder. Each junk ring is in the form of a large split spring ring. A screw stud *u* is screwed into the inner cylinder preferably through the perforation *v* which runs through the junk ring at its meeting ends, as shown in Fig. 4. This retains the junk ring from turning around and causes the openings *w* and *y* of the exhaust and intake ports respectively to properly register with the corresponding openings in the inner cylinder.

There is used in connection with this junk ring a small end thrust ring *x*, or what might be termed a wedging ring. This ring has a beveled upper surface that engages the beveled lower surface of the junk ring. Inasmuch as this ring tends to open out, it thrusts the junk ring tightly up against the top of its socket or seat and the wedging or end thrust ring itself crowds in at the bottom of the seat to gas-seal the ring at the bottom; hence, gas cannot escape over the top or around the bottom of the junk ring.

It will be noted that the wedging ring *x* is placed at the bottom of the junk ring. The reason for this is that during the explosion stroke of the motor when the compression reaches its highest value, the tendency of the sliding semi-sleeves is to drag the junk ring upwardly. This is due to the fact that when the explosion takes place the speed of the upwardly driven sleeve segment is considerably greater than the speed of the downwardly traveling sleeve segment, hence there is a differential action tending to drive the junk ring upwardly. By placing the wedging ring at the bottom, its spring pressure, together with this differential drag, both tend to seal the junk ring at its ends in the junk ring seat and thereby make as tight a seal as possible against the gases when they are under the highest compression. If the wedging ring were placed in the top of the junk ring the upward drag of the junk ring during the working stroke of the motor would lessen the pressure of the wedging ring tending to seal the junk ring at both ends. This therefore becomes an important factor in sealing the junk ring and preventing gases escaping from behind it.

With the improved separate pilot casting which I have described, the motor can be assembled without much difficulty. The crank case casting is set up, the crank shaft is put in place together with the two valve operating shafts. The pistons, the connecting rods, and the valve operating connecting rods are then secured to their respective shafts. The inner cylinders are bolted to the pilot casting by the bolts 1 while the pilot casting is on the bench. The junk rings and the wedging rings are fitted into their seats, thereupon the pilot casting, together with the inner cylinders assembled in place can be dropped over the crank case casting by means of a suitable block and tackle. The workman may then gradually drop and fit it over the pistons which are projecting upwardly. The semi-sleeves are then fitted around the inner cylinder and connected up with the sleeve operating connecting rods; thereupon the engine block casting can be dropped over the sleeves and the inner cylinders by the aid of a block and tackle, the dowel pins *o* accurately guiding the upper casting onto the pilot casting. The bolts *p* may then be inserted in the bolt holes and the three castings securely bolted together.

It will be seen that the water passages through the pilot casting serve to take the circulating water to the inner cylinder casting. The bolts 1 by which the inner cylinders are bolted to the pilot castings securely lock the inner cylinders to the pilot casting and with the interposed gasket 2, make a water tight connection. It will thus be evident that with my improved pilot casting the assembly is much easier and better accomplished than would be otherwise.

Figure 7:
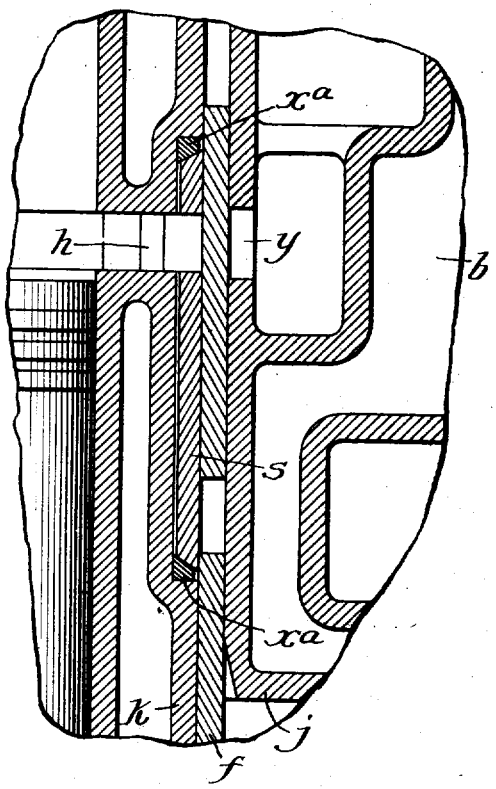
Figs. 7 and 8 are sectional details showing modified forms of junk rings.
Figure 8:
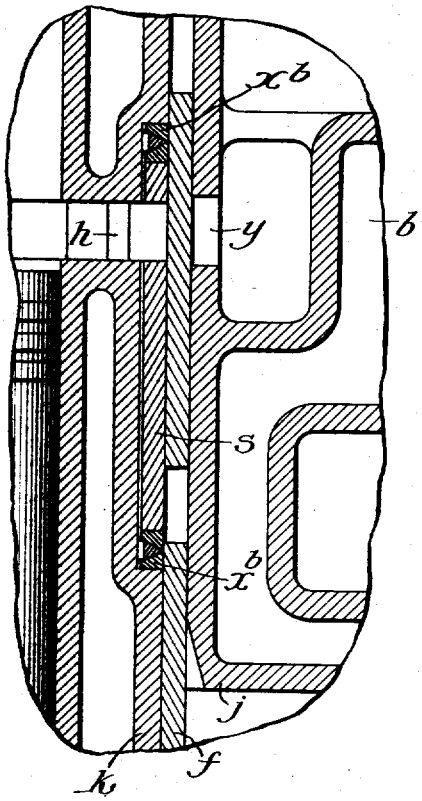

Figs. 7 and 8 show modified forms of the junk ring. In Fig. 7, there is a split wedging ring *x*—*a* at the top and bottom of the junk ring which tends to thrust in both directions. In Fig. 8, a composite wedging ring *x*—*b* is positioned at the top and bottom of the junk ring for the same purpose.

What I claim is:

1. In an internal combustion engine, the combination of an engine block provided with an outer cylinder having intake and exhaust passages, an inner cylinder provided with intake and exhaust ports registering with said passages, said inner cylinder spaced from the outer cylinder, semi-sleeve valves operating in said space for controlling said ports, and a ported junk ring for sealing said valves with respect to the ports, said junk ring being sealed by thrust at both ends.

2. In an internal combustion engine, the combination of an engine block provided with an outer cylinder having exhaust and intake passageways, an inner cylinder supported in spaced relation with respect to the outer cylinder and having intake and exhaust ports registering with said passageways, said inner cylinder provided with a junk ring seat, a semi-sleeve valve structure provided with port openings therethrough and operating in the space between the cylinders and governing the said ports, and a junk ring located in said junk ring seat provided with means for sealing itself in the seat at both ends of the ring, and comprising a relatively large split ring having port openings registering with the port openings in the inner cylinder.

3. In an internal combustion engine, the combination of an engine block provided with an outer cylinder, an inner cylinder properly centered within the outer cylinder and spaced therefrom, the outer cylinder and inner cylinder provided with registering ports and passageways, a semi-sleeve valve structure provided with port openings and operating in said space, the inner cylinder being provided with a junk ring seat, a junk ring comprising a relatively large split ring having port openings registering with the ports in the inner cylinder and seated in said junk ring seat, and a wedging ring fitted into one end of the junk ring for giving the junk ring end thrust and sealing both ends of the junk ring and seat.

4. In an internal combustion engine, the combination of an engine block provided with an outer cylinder having exhaust and intake passageways, an inner cylinder supported in spaced relation with respect to the outer cylinder and provided with registering intake and exhaust ports, semi-sleeve valves operating in said space, a sealing ring for sealing the joint between the sliding semi-sleeves and the ports, and additional means for giving such sealing ring end thrust to prevent gases escaping behind said sealing ring at either end.

5. In an internal combustion engine, the combination of an engine block provided with an outer cylinder, a crank case, a separate pilot casting fitted in between the engine block and the crank case, and an inner cylinder having its lower end removably fitted into the pilot casting for centering the lower end of the inner cylinder with respect to the outer cylinder in spaced relation.

6. In an internal combustion engine, an engine block provided with an outer cylinder, a crank case casting, a pilot casting doweled into the engine block and fitted between the engine block and the crank case casting, said pilot casting provided with pilot openings, and inner cylinders centered in spaced relation with respect to the outer cylinders at their lower ends by having pilot portions removably fitted into the pilot openings of the pilot casting.

7. In an internal combustion engine, an engine block casting provided with a plurality of outer cylinders, a crank case casting, a pilot casting secured between the engine block casting and the crank case casting and having an accurately fitted relation with respect to the engine block casting, the said pilot casting provided with a bridge having a plurality of pilot openings, and inner cylinders having pilot portions removably fitted into said pilot openings and thereby centered in spaced relation with respect to the outer cylinders.

8. In an internal combustion engine, an engine block casting provided with a plurality of outer cylinders with water jacket space, a crank case casting, a pilot casting secured between the engine block casting and the crank case casting and provided with water circulating space arranged to communicate with the water jacket of the engine block, said pilot casting provided with pilot openings and said inner cylinders provided with pilot parts fitted into the said pilot openings and provided with water circulating space arranged to communicate with the water circulating space of the pilot casting.

9. In an internal combustion engine, the combination of an engine block provided with an outer cylinder having exhaust and intake passages, an inner cylinder fitted in spaced relation with respect to the outer cylinder and having ports registering with said passages, a semi-sleeve valve structure reciprocating in the said space, a junk ring and junk ring seat, said junk ring arranged to engage with the sleeve valve structure, the sleeve valve structure being arranged to operate so that there is an upward drag on the junk ring during the explosion stroke, and an end thrust ring crowding between the junk ring and its seat at the bottom of the junk ring.

10. In an internal combustion engine, an outer cylinder having intake and exhaust passages, an inner cylinder, a piston reciprocable in the inner cylinder, said inner cylinder being spaced from the outer cylinder, semi-sleeve valves operating in said space for controlling said passages, and a ported junk ring for sealing said valves with respect to the said ports, said junk ring being sealed at both ends by thrust.

11. In an internal combustion engine, the combination of an engine block provided with an outer cylinder having intake and exhaust ports, an inner cylinder supported in spaced relation with respect to the outer cylinder, semi-sleeve valves operating in said space, a sealing ring for sealing the joint between the sliding semi-sleeve valves and the ports, and additional means for giving such sealing ring end thrust to prevent gases escaping behind said sealing ring at both ends.

12. An internal combustion engine embodying an engine block provided with an outer cylinder, a crank case, a crank in the case, a separate pilot casting, means supporting the casting, above the said crank, and an inner cylinder having its lower end removably fitted in the pilot casting for centering the lower end of the inner cylinder with relation to the outer cylinder in spaced relation.

13. An internal combustion engine embodying an engine block provided with an outer cylinder, a crank case, a crank in the case, a separate pilot casting, means embodying anchor bolts for supporting the casting above the said crank, and an inner cylinder having its lower end removably fitted in the pilot casting for centering the lower end of the inner cylinder with relation to the outer cylinder in spaced relation.

14. An internal combustion engine embodying an engine block provided with an outer cylinder, a crank case, a crank in the case, a separate pilot casting, means supporting the casting above the said crank, and an inner cylinder having its lower end reduced to form a circumferential shoulder spaced from the lower extremity of the cylinder, said reduced portion removably fitting in said casting for centering the lower end of the inner cylinder with relation to the outer cylinder in spaced relation, the said circumferential shoulder on the inner cylinder abutting the said pilot casting.

In testimony whereof, I have signed my name to this specification, on this 6th day of May, 1931.

JOHN HEBER COYNE.